United States Patent Office 3,468,229
Patented Sept. 23, 1969

3,468,229
PHOTOGRAPHIC CAMERA INCLUDING A SCANNING EXPOSURE SYSTEM WITH COMPENSATION FOR CYLINDRICAL PERSPECTIVE DISTORTION BY OPTICAL PATH LENGTH CHANGES
Alfred H. Bellows, Cambridge, Mass., assignor to Polaroid Corporation, Cambridge, Mass., a corporation of Delaware
Filed May 17, 1967, Ser. No. 639,292
Int. Cl. G03b 37/02
U.S. Cl. 95—15
14 Claims

ABSTRACT OF THE DISCLOSURE

This disclosure depicts a compact hand-held photographic camera with a scanning exposure system having a folded optical path. Compensation means are disclosed by which the magnification of elemental images formed successively by the exposure system may be altered during a scan of the object by varying the optical path length of exposure light in image space.

Summary of the invention

One form of this invention concerns a scanning exposure system for exposing photosensitive materials in a compact photographic camera, including image-forming means for forming an image of an object to be photographed at a predetermined image area and scanning means cooperating with the image-forming means to effect a continuous angular optical scan of the object such that successively scanned object points are imaged in succession by the image-forming means. Compensation means are included for altering the magnification of successively formed elemental images by varying the optical path length of exposure light in image space such that the images formed are substantially free of cylindrical perspective distortion, as defined herein. It is another aspect of this invention that means be provided in such a scanning exposure system coordinated with the scanning means for causing all parts of the said total image to be in sharp focus.

Background of the invention

Traditionally, hand-held photographic cameras designed to accommodate photosensitive materials with relatively large format film have been relatively bulky and cumbersome when in use because of the size of the exposure chamber which is necessary to form a relatively large photographic image with a conventional static rectilinear imaging system. The utilization of bellows is common for enabling cameras to be folded when not in use. However, the necessity of erecting such folding cameras before use and the somewhat large overall dimensions of the erected camera when in use has proven to be an inconvenience. The use of short focal length, wide angle lenses has enabled the use of non-folding cameras with rigid-walled exposure chambers; however, apart from being somewhat bulky, the relatively small scale of the image and the problems attending the use of wide angle objectives renders such cameras unsatisfactory for many photographic applications.

This invention concerns a compact camera which overcomes the objections set forth above, accommodating a relatively long focal length objective and a correspondingly large format film, and yet offering a permanently erected exposure system in an extremely compact rigid housing. In order to obtain such a compact camera, in one form (illustrated in FIGURE 1) the exposure light path is folded along two mutually orthogonal axes parallel to the length and depth dimensions of the camera. The camera functions by effecting a continuous angular optical scan of the object to be photographed while simultaneously imaging successively scanned object points through a focal plane exposure slit upon photosensitive materials caused to move behind the slit at a velocity which is coordinated with the rate at which the object is scanned.

A scanning exposure system, as described is subject to inherent aberrations of any practical lens, namely, the monochromatic (Seidel) aberrations consisting of astigmatism, coma, Petzval curvature (curvature of field), distortion, and spherical aberration in addition to the chromatic aberrations. However, such a scanning system is also subject to a number of additional aberrations, the correction of one of which, cylindrical perspective distortion (defined below), is an important part of this invention.

Objects of the invention

Accordingly, it is an object of this invention to provide an extremely compact photographic camera having a scanning exposure system and means for varying the optical path length of exposure light in image space to compensate for cylindrical perspective distortion in the images formed by the exposure system.

It is another object of this invention to provide a compact photographic camera having a scanning exposure system for optically scanning an object to be photographed and imaging successively scanned object points in succession at a predetermined image area such that a complete image of the object may be recorded upon image-receiving means moved relative to the image area during a scan of the object, the system further including compensation means coordinated with the scanning means for altering the magnification of elemental images formed successively during a scan of the object by varying the optical path length of exposure light in image space such that all parts of the total image formed are substantially free from cylindrical perspective distortion, as defined above.

It is a further object that such compensation means be adaptable to a scanning exposure system having an optical path folded such that it may be accommodated in an extremely compact exposure chamber.

It is yet another object of this invention to provide means for altering the effective focal distance during a scan of the object of image-forming means comprising part of such a scanning exposure system such that the images formed are substantially free from cylindrical perspective distortion and the focal plane of the image-forming means is at all times during a scan maintained substantially in a predetermined image plane.

Other objects of the invention will in part be obvious and will in part appear hereinafter.

The invention accordingly comprises the apparatus possessing the construction, combination of elements and arrangement of parts which are exemplified in the following detailed disclosure and the scope of the application of which will be indicated in the claims.

For a fuller understanding of the nature and objects of the invention, reference should be had to the following detailed description taken in connection with the accompanying drawings.

Description of the preferred embodiments

Figure 1:
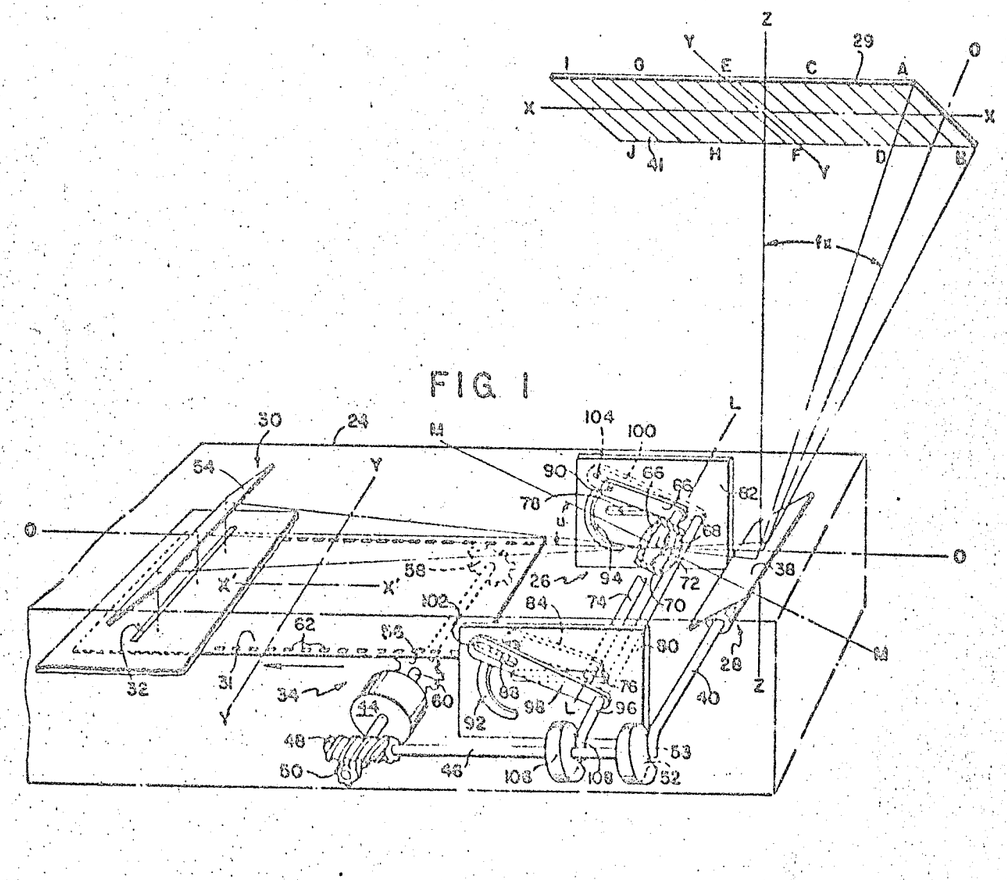
FIGURE 1 is a schematic illustration of a compact photographic camera including a scanning exposure system constructed in accordance with the principles of the invention.

FIGURE 1 schematically depicts a compact photographic camera having a scanning exposure system which includes means embodying the principles of the invention. However, before entering into a discussion of the invention and possible implementations thereof, it is of value to first understand the nature and cause of the above-indicated aberrations existing in a scanning exposure system, as described, which are in addition to the Seidel aberrations.

Figure 2:
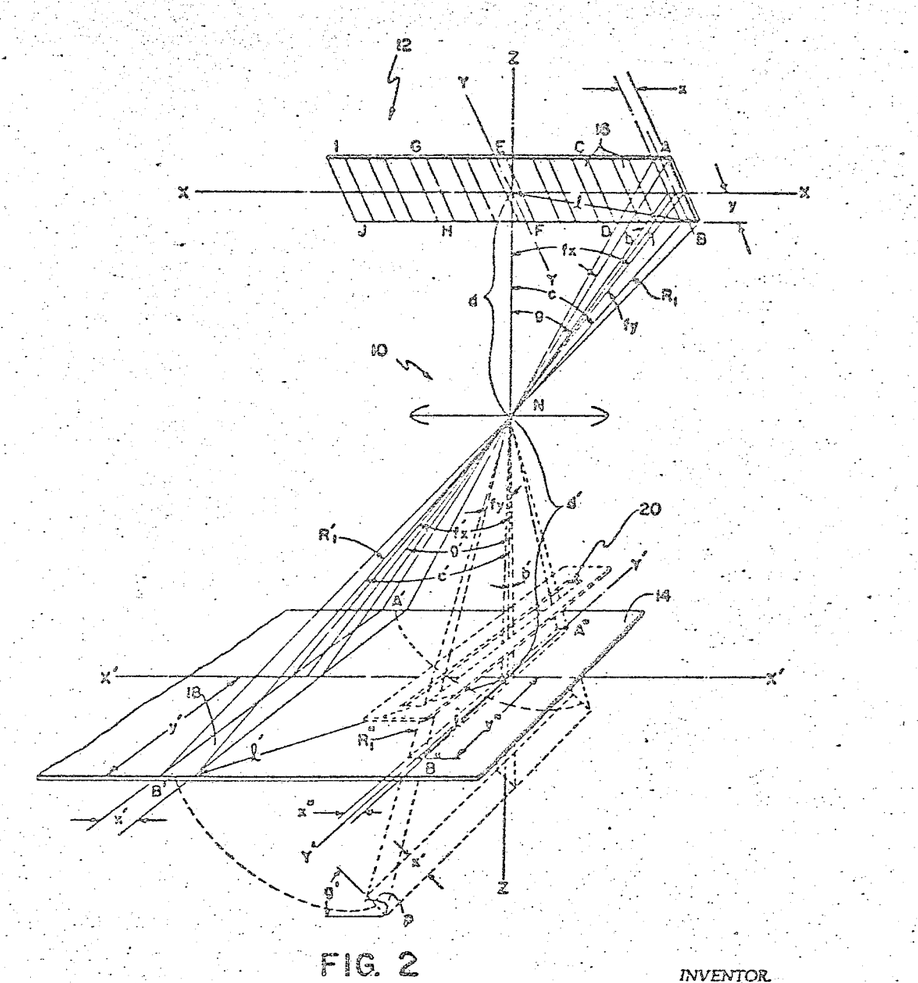
FIG. 2 is a schematic illustration of photographic image-forming systems which is useful in connection with an understanding of the background of the invention.

The nature of these additional aberrations, perhaps more aptly termed distortions, which exist in a scanning exposure system of the type described may be best understood by referring to FIG. 2 which shows schematically (in unbroken lines) a conventional static rectilinear image-forming system 10 for forming an image of an assumed focus plane, herein termed object 12, upon a planar sheet of a photosensitive material 14. The object 12 is shown as having an essentially rectangular grid-like configuration comprising a plurality of pairs of parallel lines defining equally spaced parallel strips 16 on the object 12. It is assumed that the illustrated system is orthoscopic, that is to say that the system is corrected at least for Seidel distortion such that uniform lateral magnification of the image is produced throughout the usable field. It is further assumed that the image-forming means 10 is corrected for Petzval curvature and spaced from the photosensitive material 14 such that the focal field is flat and coincident with the plane of the photosensitive material 14.

For convenience of explanation and understanding, the ends of certain of the strips 16 on the object 12 have been given literal designations; the ends of corresponding images 18 of the object strips 16 are also designated literally by corresponding primed letters.

Figure 3:
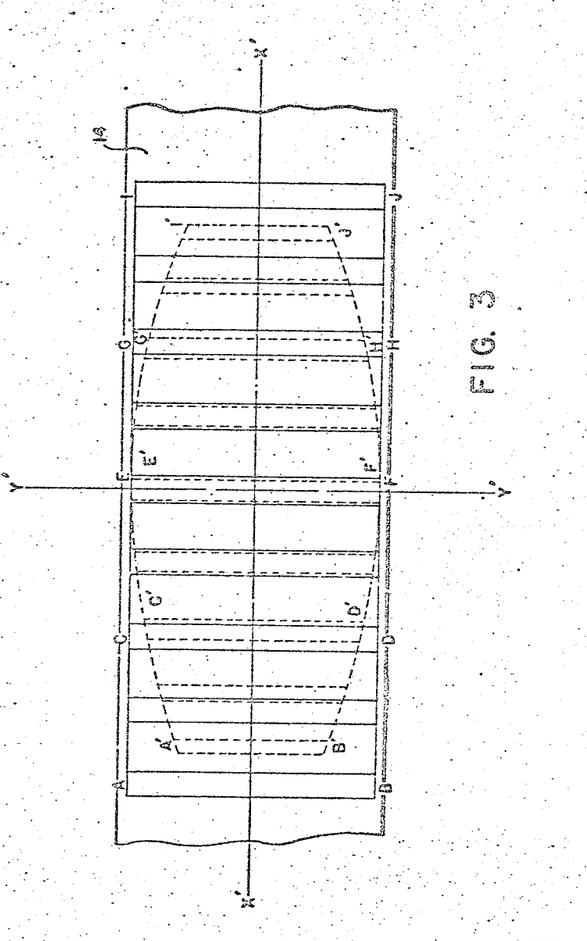
FIG. 3 is a representation of images which might be formed on image-receiving means in accordance with the image-forming systems of FIG. 2.

An image of object 12 formed by the described static rectilinear imaging system, assumed to have a flat focal field and produce a (Seidel) distortion-free image, would appear as shown in solid lines in FIG. 3 with all grid lines parallel to the X—X axis in the object 12 appearing parallel to the X′—X′ axis in the image; likewise all object lines parallel to the Y—Y axis in the object are imaged parallel to the corresponding Y′—Y′ axis in the image. In other words, the image formed by the system exhibits uniform lateral magnification throughout the entire field.

A condition of constant magnification throughout the field demands that, in accordance with Airy's tangent condition of orthoscopy, the tangent of the angle (herein termed the slope angle) which any selected chief object ray makes with axis Z—Z must equal the tangent of the slope angle which the corresponding image ray makes with the same axis. The condition of orthoscopy further requires that the ratio of image distance to object distance be invariant throughout the field. In FIG. 2, the tangent of the slope angle $c$ between object chief ray $R_1$ and the Z—Z axis equals the tangent of the corresponding slope angle $c'$ in image space defined by the image chief ray $R'_1$ and the axis Z—Z. Thus, as seen in FIG. 3, the (solid line) image of the grid-like assumed object 12 that would be formed by the image-forming means 10 is an accurate and undistorted facsimile of the object 12.

The camera with which the subject invention is particularly suited, described briefly above, is rendered capable of exposing a relatively large format film with a comparatively long focal length objective in an extremely compact exposure chamber by causing the light path from the scene to the photosensitive material to be folded, and by effecting a scan of the object simultaneously and in close coordination with a transport of the photosensitive material behind a fixed focal plane exposure slit. With such an exposure system the effective field angle along the scan (X—X) axis of the image-forming means 10 at any instant during exposure is a fraction of the field angle defining the total field captured during a total exposure interval.

In terms of the FIG. 2 illustration, to expose the entire object 12 to produce an image as shown in solid lines in FIG. 3 with a static rectilinear system, a half-field angle along the X—X and Y—Y axes, designated $f_x$ and $f_y$, respectively, in the object space and $f'_x$ and $f'_y$, respectively, in the image space, and a correspondingly large exposure chamber would be required. Scanning panoramic cameras of the type which maintain the photosensitive materials in a fixed position during exposure also require a correspondingly large exposure chamber. The camera with which this invention is associated enables the use of an exposure chamber which is compact in comparison. This camera effects an exposure of the entire object 12 by scanning successive strips (parallel to the Y—Y axis) of the object (with means not shown in FIG. 2) and imaging the elemental scanned strips along a fixed axis through an elongated focal plane slit upon photosensitive material 14 caused to be transported at a predetermined velocity behind the slit. The broken line portion of FIG. 2 illustrates very schematically, without showing specific means for scanning the object or means for folding the optical path from the scanned elements, that by scanning the object and folding the optical path from the scanned elements to the photosensitive material 14, the effective instantaneous half-field angle $b$ ($b'$ in the image space) along the X—X axis which is required at any instant during exposure is a fraction of the total half-field angle ($f_x$) along the same axis.

The broken line portion of FIG. 2 is useful also in illustrating the effect upon image formation of maintaining the image distance constant in a scanning exposure system for object distances varying in accordance with changing scan angles.

As indicated above, certain distortions not occurring in static rectilinear exposure systems are inherent in scanning exposure systems in which the image distance is maintained substantially constant for all object distances. The broken line ray diagram in FIG. 2 represents the light forming an image of strip AB, as it would appear if deflected at nodal point N along the Z—Z axis and through the focal plane aperture 20 into impingement with the photosensitive material 14. From a study of FIG. 2, it may be recognized that the image of strip AB, as it would appear if imaged as shown in the broken line segments of FIG. 2, would form an image A″B″ which is not only unfocused, but which is distorted by a lack of scale. The image A″B″ lacks the proper scale along both the X′—X′ and Y′—Y′ axes resulting from a loss in magnification over what would be obtained in a static rectilinear system corrected as indicated above. Thus, $y''$ is less than $y'$ and $x''$ is less than $x'$. This magnification deficiency is due to the effect of an insufficient image distance in relation to the object distance of strip AB. Consider the effect, for example, on chief ray $R_1$. Recalling that for uniform lateral magnification of the image throughout the field, the tangent of angle $c'$ must equal the tangent of angle $c$, it is seen that whereas in the rectilinear system the ratio of $l'/d'$ (the tangent of angle $c'$) is proportional to $l/d$ (the tangent of angle $c$), the ratio of $l''/d''$ is not proportional to the ratio of $l/d$ and thus the lateral magnification of the image $A''B''$ is not as great as it must be if the image to be produced by the scanning system as described is to have constant lateral magnification throughout the field.

As explained above, the unbroken lines in FIG. 3 represent the image of object 12 that would be formed by an orthoscopic image-forming system. The broken lines represent a full image of the illustrated object 12 which might result if a scanning exposure system as described were employed to photograph the object 12. The image, as described above, would be formed by scanning adjacent elemental strip areas of the object 12 from right to left (with scanning means not shown) concurrently as the photosensitive material 14 is caused to be transported behind the focal plane slit 20 at a velocity effective to maintain the image being formed on the material 14 stationary with respect to the material 14. From a study of FIG. 3, it is seen that the image thus formed exhibits a lack of scale which increases toward the extremes of the field.

Or stated in another way, a cylindrical perspective relationship exists between the object 12 and its image 21. Assuming a planar object, as shown, object areas of equal magnitude subtend, with respect to the nodal point N of the image-forming means 10, successively smaller angles at greater off-axis scan angles. However, because of the varying image magnification, due to the changing ratio of image distance (constant for all scan angles) to object distance (varying with the scan angle) in the illustrated system, the images thus formed of off-axis points will have insufficient scale.

Because of this cylindrical perspective relationship of object and image (cylindrical perspective being represented by the projection of an object upon a cylindrical projection surface having its axis passing through the axial viewpoint, in this instance located at the nodal point N) the distortion produced in the images formed, as described, is herein termed cylindrical perspective distortion.

It should be understood in connection with the above discussion that the image distance in the described scanning exposure system indicated to be constant is only constant with respect to the scan ($X-X$) axis, and that along the $Y-Y$ axis the conditions of a static rectilinear system obtain. A lack of magnification is introduced in the direction parallel to the $Y-Y$ axis which is of a magnitude proportional to the secant of the effective instantaneous scan angle; however, the resulting distortion is simply a scale error caused by the dependence of the $Y-Y$ axis scale coefficient upon the scan angle. The effective instantaneous scan angle is defined in this application as being the scan axis component of the slope angle in object space of the chief ray from an object point being scanned.

In addition to the cylindrical perspective distortion resulting from the compression of the image along the $X'-X'$ axis and $Y'-Y'$ axis, an additional distortion is introduced because of the angle which the image plane of the image-forming means makes with the plane of the photosensitive material 14. This angle has been designated $g'$ in the broken line portion of FIG. 2, being the same as the scan angle $g$. The projection $A''B''$ upon the photosensitive material of the deflected image $A'B'$ is shortened in its dimension along the $X'-X'$ axis by a factor proportional to the secant of the instantaneous scan angle $g$. This distortion, which may be termed oblique distortion, introduced in the direction along the $X'-X'$ axis, although present and very real, is not the concern of this invention and is, in the interest of clarity and simplicity, disregarded below wherever practicable.

It can be seen from FIG. 2 that:

$$x''/p = 1/\sec g'$$

and $$p/x' = 1/\sec g'$$

Therefore $$x'/x'' = \sec^2 g' = \sec^2 g$$

Thus, the total distortion along the $X'-X'$ axis of an image produced by the described scanning exposure system (aside from any true Seidel distortion which may exist in the image-forming system 10) is proportional to the square of the secant of the instantaneous scan angle $g$ and is due to the combined effect of cylindrical perspective distortion and oblique distortion. The total distortion in the direction parallel to the $Y'-Y'$ axis is proportional to the first power of the secant of the instantaneous scan angle $g$ and is due solely to the above-described effect of cylindrical perspective distortion.

The invention set forth and claimed in this application is directed to means combined with a scanning exposure system for compensating for cylindrical perspective distortion which would otherwise be present in the images formed by such a system. Referring to FIGURE 1, the novel exposure system may be contained in a camera having a very compact housing, the broken lines defining the outline of a housing 24 which would be sufficiently large to accommodate the necessary components of a photographic camera embodying such a scanning exposure system.

The illustrated scanning exposure system in its broadest aspect comprises image-forming means, shown by way of example as a simple symmetrical duplet lens 26, scanning means 28 cooperating with the lens 26 for successively scanning adjacent elemental strip areas of an object 29 to be photographed (here shown as a planar object similar to object 12 in FIG. 2), and light reflective means 30 for folding the optical path of the exposure light from the lens 26 to the photosensitive materials 31. A focal plane exposure aperture or slit 32 is located in a plane parallel to and justaposed with the plane of the photosensitive materials 31. Transport means 34 are provided for transporting the photosensitive materials 31 behind the slit 32 during an exposure interval.

Although other arrangements are contemplated in the illustrated embodiment the element farthest forward in the exposure system is the scanning means 28, shown as comprising a planar scanning mirror 38 mounted upon a shaft 40 for rotation about an axis parallel to the $Y-Y$ axis. Means are provided for causing scanning mirror 38 to oscillate during an exposure interval to scan along the $X-X$ axis from one extreme to the other of the assumed object 29 to be exposed. In the illustrated embodiment such means are shown as taking the form of a motor 44, which may, for example, be electrically or spring powered, which drives a shaft 46 through a set of worm gears 48, 50 upon which is mounted an axial cam 52 operatively engaging a transverse extension 53 on shaft 40. It is evident that by a proper design of the depicted scanning means, the scanning mirror 38 may be caused to periodically scan an object to be photographed through any desired field angle and return again to its initial position, and may be caused to do so at any desired periodic rate.

As indicated above, the illustrated system includes light reflective means 30 for folding the exposure light from the lens 26 to the photosensitive materials 31. The light reflective means 30 for this purpose may take the form of a planar mirror 54 disposed adjacent the slit 32 and angled with respect to the plane thereof for directing the exposure light in the image space through the slit 32 and into impingement with the photosensitive materials 31. In the illustrated exposure system the mirror 54 comprises, in combination with the scanning mirror 38, means for folding the optical axis of the exposure light substantially along mutually orthogonal axes parallel to the X—X and Y—Y axes, respectively. As discussed above in connection with the background for this invention, with such a scanning exposure system the effective instantaneous field angle along the X—X axis in image space is but a fraction of the total field angle in object space (along the same axis), which may be captured during an exposure interval. Thus, the depicted scanning exposure system may have an exposure chamber whose dimension in the direction corresponding to the X—X axis is very substantially less than the corresponding dimension in the exposure chamber of a conventional hand-held camera employing a static rectilinear system of corresponding focal length and film format size.

Transport means 34 are provided for transporting the photosensitive materials 31 behind the exposure slit 32 during an exposure interval at a velocity which is closely coordinated with the sweep rate of the scanning mirror 38. Careful correlation between the film transport velocity and the scan rate is necessary in order that successively scanned object points are imaged in the correct adjacent relationship on the photosensitive materials 31 to cause the image formed on the photosensitive materials 31 to be substantially stationary with respect thereto. Such transport means may include the motor 44 and a pair of sprockets 56, 58, mounted on shaft 60 for engaging perforations 62 in the photosensitive materials 31 to provide a driving connection between the motor 44 and the photosensitive materials 31.

As more fully explained in the above-identified copending application, the transportation of the photosensitive materials 31 behind the exposure slit 32 effectively acts as a focal plane shutter. The time during which each point on the photosensitive materials 31 is exposed during a total exposure interval accords with the relationship:

$$T = S/V$$

where $S$ = slit width and $V$ = velocity at which the photosensitive materials 31 are transported relative to the exposure slit 32.

It is evident that by a proper selection and correlation of the rotational speed of the motor 44, the gear ratio of the worm gears 48, 50, the relative radii of the sprockets 56, 58 and the shaft 60 upon which they are mounted, and the factors involved in the cam drive by axial cam 52 of the mirror 38, the rate at which the object 29 is scanned by the scanning mirror 38 may be very closely coordinated with the velocity at which the photosensitive materials 31 are transported behind the exposure slit 32.

It is noted that a constant sweep rate of the scanning mirror 38, assuming a constant velocity of the photosensitive materials during exposure, would produce an image that is smeared increasingly toward the extremes of the field. This smearing of the image is a result of the increasing effective sweep rate across the surface of the photosensitive materials 31 at increasing off-axis scan angles. A comprehensive understanding of the sweep velocity characteristic of the scanning mirror 38 which is necessary to produce an image without smear is not essential to the understanding of this invention and, accordingly, an in depth analysis of this problem is not thought to be appropriate here. However, it is noted that required sweep rate is a function of the square of the cosine of the instantaneous scan angle.

A scanning exposure system constructed in accordance with the teachings of the above-identified copending application may employ a conventional fixed-focus photographic objective as the image-forming means for the system; however, for the reasons set forth above, the images produced will exhibit cylindrical perspective distortion, defined above. In accordance with the principles of this invention, means are provided for altering the magnification of elemental images formed successively during an exposure interval such that all parts of the total image formed are substantially free of cylindrical perspective distortion.

In order that the magnification may be altered as an object is scanned, in accordance with this invention the optical path length of exposure light in image space, and thus the effective image distance, is caused to be varied in a predetermined program during an exposure interval.

It is evident, however, that if such changes in optical path length were effected without providing for corresponding changes in the effective focal distance of the image-forming means the images formed by such a scanning exposure system would exhibit a lack of focus increasing in magnitude toward the extremes of the field (along the X—X axis). Therefore, in accordance with another aspect of this invention, means are provided for changing the effective focal distance of the image-forming means during a scan of an object in coordination with the said changes in optical path length of the exposure light.

FIGURE 1 schematically illustrates structure embodying the principles of the invention which may be used to conjointly accomplish the afore-described changes in the optical path length and effective focal distance. In accordance with this invention, the lens 26, in combination with the aperture stop, is orthoscopic, acting to produce an image which is substantially free of Seidel distortion. Stated in another way, the effective focal distance of the lens 26 for any given object point is a function of the secant of the slope angle of the object chief ray from that point.

In the FIGURE 1 embodiment of the invention, the lens 26 is illustrated schematically as a simple symmetrical duplet lens comprising a pair of meniscus elements 66 and 68 supported in a lens holder 70. A between-the-lens aperture stop 72 is shown disposed centrally between elements 66 and 68. A simple, two-element lens has been depicted for the sake of clarity in describing the invention. It should be understood, however, that in practice a more highly corrected lens may be preferred. The lens 26 forms images at an image area, defined herein as being that area at which it is desired to record the images, which may or may not coincide with or contain the focal surface in which the best image is formed.

In accordance with this invention, the lens 26 is moved along the axis O—O during exposure to change the optical path length of the exposure light in image space, and thus the image distance, to accomplish the described magnification changes. Simultaneously therewith, the lens 26 is pivoted about an axis (labeled L—L in FIGURE 1) parallel to the slit 32 (and to the Y—Y axis) causing the effective slope angle (with respect to the geometrical axis M—M of lens 26) of chief rays from successively scanned object points to vary with resulting corresponding variations in the effective focal distance of the lens 26.

Exemplary structure for effecting such simultaneous translatory and rotary movement of lens 26 may include a shaft 74 affixed to lens 26 for rotatably mounting lens 26. The ends of shaft 74 are supported in slots 76, 78 in a pair of end plates, 80, 82, respectively. A pair of radial arms 84, 86 affixed to shaft 74 carry pins 88, 90 extending into arcuate slots 92, 94 in end plates 80, 82, respectively.

Lens driving means are provided for causing the pins 88, 90 to periodically traverse the slots 92, 94 to cause the lens 26 to be simultaneously rotated about axis L—L and translated along the optical axis O—O. Such lens driving means are illustrated as comprising a shaft 96 journaled in the end plates 80, 82 upon which is mounted a pair of radial drive members 98, 100 having slots 102, 104 which receive pins 88, 90, respectively.

The shaft 96 may be driven with the requisite oscillatory motion by means of a cam 106 on cam shaft 46 operatively engaging a transverse extension 108 on shaft 96. By a proper design of the camming surface on cam 106, the configuration of the arcuate slots 92, 94, and the other relevant mechanical parameters, the lens 26 may be translated along axis O—O and rotated about axis L—L during exposure in accordance with any desired program and in intimate coordination with the scan of the object 41 effected by scanning means 28. It is noted that, because of the nature of a scanning reflective surface, the camming surfaces of cams 106 and 52 are configured such that the lens 26 is given an angular rate of rotation which is twice that of the scanning mirror 38.

The manner in which the above-described deficiency in scale in the images of off-axis object points is compensates in accordance with this invention may be most easily understood in connection with a description of the operation of the total exposure system. It should be noted that in order to prevent a premature exposure of the photosensitive materials 31, either a capping shutter may be employed, or alternatively, the leading edge of the area of the photosensitive materials 31 to be exposed may be maintained sufficiently offset from the slit 32 to preclude exposure by stray light. Prior to the initiation of an exposure interval, the angular attitude of cams 52 and 106 are preset such that the scanning mirror 38 is oriented to scan the object from right to left (in FIGURE 1) and the pins 88 and 90 are located at corresponding extremes of the arcuate slots 102 and 104, respectively. With the pins 88, 90 positioned thus, the lens-to-film distance is at a maximum, producing the greatest image magnification, and the angular separation, defined by angle $u$, between the geometrical axis M—M and the optical axis O—O is also at a maximum, the lens 26 thereby having the greatest effective focal distance.

The operation of the exposure system is as follows. An exposure interval is initiated by the energization of drive motor 44, causing the photosensitive materials 31 to be driven at a predetermined velocity behind the exposure slit 32. Through worm gears 48, 50 driving axial cam 52, the scanning mirror 38 is caused to sweep across the object to be photographed at a sweep velocity coordinated with the rate at which the photosensitive materials 31 are transported behind the slit 32. The manner in which the image magnification and the effective focal length of the lens is varied during an exposure interval may be more clearly understood by reference to FIGS. 4a–4e which represent a time sequence of ray diagrams during an exposure interval. FIGS. 4a–4e depict the manner in which the magnification of strip images of successively scanned object strips is varied during an exposure interval to produce a total image all parts of which are in focus and substantially free from cylindrical perspective distortion.

Figures 4A, 4B, 4C, 4D, 4E:
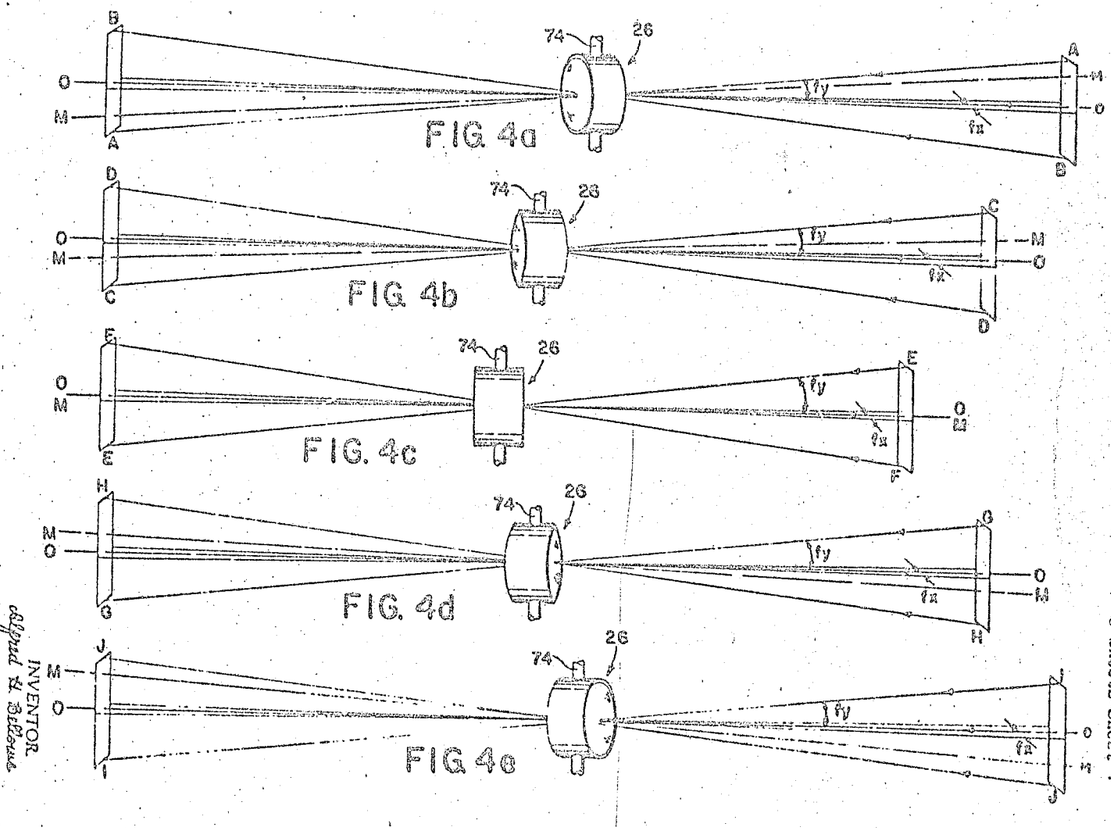
FIGS. 4a–4e are time sequence diagrams illustrating the manner in which magnification and focal distance are altered during a scan of the object in accordance with the invention to produce images all parts of which are in focus and substantially free from cylindrical perspective distortion.

As shown in FIGS. 1 and 4, during the first half of an exposure interval as one half of the total field, designated by the half-field angle $f_s$, is scanned, the optical path length in image space of the light from successively scanned object areas, and hence the instantaneous effective image distance, is decreased from a maximum to a minimum with a characteristic according with the secant of the effective instantaneous scan angle. Accordingly, the magnification decreases from a maximum to a minimum value with a similar characteristic. Simultaneously therewith, the lens 26 is rotated about axis L—L to effect a decrease in its effective focal distance in a characteristic which is also related to the secant of the effective instantaneous scan angle.

Similarly, on the opposed side of the Z—Z axis, changes in the effective focal length of lens 26 and in the image magnification are effected, but with an increasing, rather than decreasing, magnitude. The changes in magnification and effective focal length are coordinated in a predetermined program, as described, such that during an exposure interval a total image is produced, all parts of which are in focus and substantially free from cylindrical perspective distortion.

The program or characteristic by which the magnification and effective focal distance are varied during a scan of the object in accordance with the invention has been related in the above explanation to the magnitude of the effective instantaneous scan angle. As stated above, the effective instantaneous scan angle is defined herein as being equal to the scan axis (X—X) component of the slope angle (with respect to the Z—Z axis) of the chief ray in object space from an object point being scanned. It follows then, that the explanatory matter above may be thought of in terms of chief rays from scanned object points and associated slope angle components, rather than in terms of scan angles.

Figure 5:
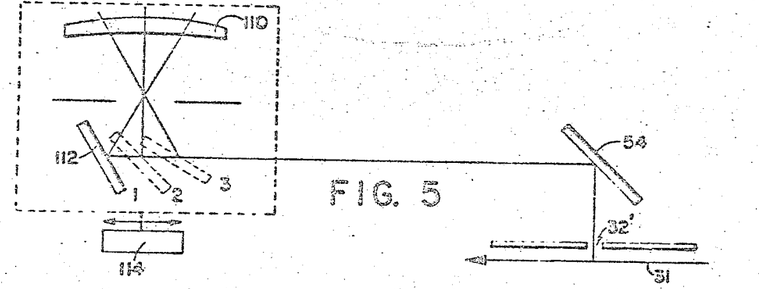
FIGS. 5–7 are schematic illustrations of alternative embodiments of the invention.

One embodiment of the invention has been described. Other structural implementations of the invention are contemplated. In FIG. 5 an embodiment is shown where in a substantially distortionless, flat-field lens (shown schematically as a simple meniscus lens 110) is located forward of a scanning mirror 112 employed to effect a scan of the object to be photographed. The scanning mirror 112 is simultaneously rotated and translated during an exposure interval, as shown in the numbered position sequence in FIG. 5, to effect an angular optical scan of the lens 110. As indicated above, the lens 110 is substantially free from Seidel distortion and has a flat focal field such that the effective focal distance for any given object point is a direct function of the slope angle of the chief ray from that point. Thus, by effecting an angular optical scan of the lens 110, as shown, the effective focal distance, at any instant during exposure, will vary in accordance with the instantaneous scan angle effected by the scanning mirror 112.

In order to accomplish magnification changes during a scan of the object, in the FIG. 5 embodiment means, shown only schematically at 114, may be provided for causing a gross movement of the lens 110 and scanning mirror 112 to effect changes in the optical path length in image space. This gross movement of the lens 110 and scanning mirror 112 by means 114 is closely coordinated with the compound movement of scanning mirror 112 to produce a simultaneous variation in the effective focal distance and in image magnification in accordance with the teachings of this invention. In FIG. 5, the mirror 54' and the focal plane exposure slit 32' correspond to mirror 54 and slit 32 in the FIGURE 1 structure.

Figure 6:
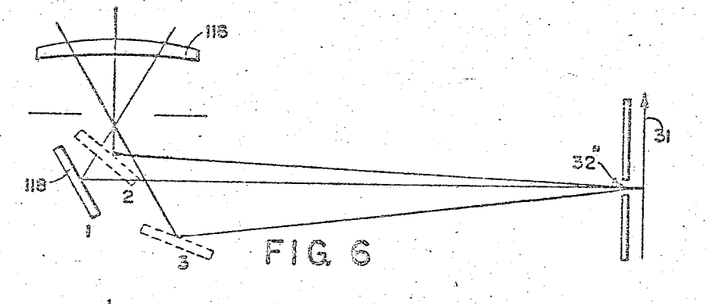

FIG. 6 schematically shows still another structure by which the invention may be implemented. The FIG. 6 embodiment employs a substantially distortionless flat-field lens 116. A scanning mirror 118 is caused to be simultaneously rotated about an axis parallel to an exposure slit 32" (corresponding to slit 32 in the FIGURE 1 embodiment and 32' in the FIG. 5 embodiment) and moved along a locus of travel, the configuration of which is effective to produce changes in the optical path length of exposure light in image space which have been taught by this invention. Thus, the translatory movement of the mirror 118 effects the magnification changes necessary to eliminate cylindrical perspective distortion from the images formed, and the simultaneous scan of the lens 116 by the mirror 118 produces the changes in effective focal distance necessary to maintain sharp focus.

It is noted that the time sequence diagrams in FIGS. 4a–4e also portray the net effects on optical path length and effective focal distance produced by the FIG. 5 and FIG. 6 embodiments, as well as by the FIGURE 1 embodiment.

It is further noted that the fixed mirror (32 in FIGURE 1 and 32' in FIG. 5) may be rotated 90°, or alternatively, or may be removed entirely, as shown in FIG. 6, without departing from the principles of this invention.

Figure 7:
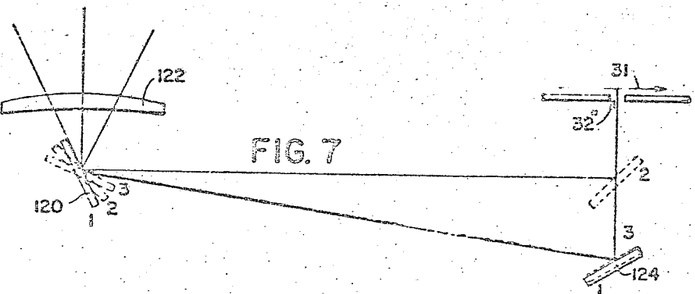

FIG. 7 shows yet another embodiment of the invention. A scanning mirror 120 mounted for rotation about a fixed axis is used to scan a flat-field, distortionless lens 122. Light deflected by the mirror 120 is redirected by a second planar mirror 124 to the exposure slit 32'''. The second mirror 124 is moved through a locus of travel (by means not shown) represented by the numbered sequence shown in FIG. 7 to accomplish the changes in optical path length taught by this invention. As in the FIGS. 5 and 6 embodiments, the necessary changes in effective focal distance are produced by the scan of lens 122 by the scanning mirror 120. Thus, this invention shows an embodiment in which the optical path length changes are accomplished by means exclusive of the scanning surface.

Figures 8, 9:
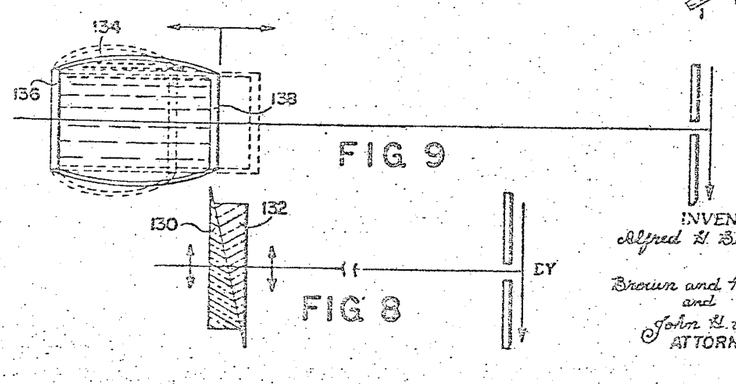
FIGS. 8 and 9 are schematic illustrations of alternative embodiments of one aspect of the invention.

Certain changes may be made in the above apparatus without departing from the scope of the invention herein involved. For example, the invention may be implemented in structures employing combinations of means for varying the optical path length and means for varying the effective focal distance other than those particular combinations illustrated and described. Changes in the optical path length in image space to effect the afore-described magnification changes may be produced by inserting a pair of oppositely acting prisms, as illustrated in FIG. 8 at 130 and 132, which could be rendered movable transversely relative to each other (as indicated by the direction arrows) to vary the amount of higher index material in the converging light path, and thus change the optical path length. A similar result may be achieved (see FIG. 9) by the use of a liquid reservoir contained in a resilient-walled casing 134 between optically flat plates 136 and 138. The path length of the exposure light in image space may be varied by altering the distance separating the optical plates 136, 138, for example by moving one or both of the plates 136, 138, as shown by the direction arrows.

As other examples, prisms or other scanning means might be employed for scanning the scene to be photographed. Means other than as shown might be employed for folding the optical path. Other structures may be devised by those skilled in the art for accomplishing the transportation of the photosensitive materials in coordination with appropriate scanning means and means for producing the changes in magnification taught by this invention. Whereas the principles of the invention have been depicted in terms of a "still" camera, the invention may be readily adapted for implementation in cinematographic cameras. It is therefore intended that all matter contained in the above description or shown in the accompanying drawings shall be interpreted as illustrative and not in a limiting sense.

What is claimed is:

1. A photographic camera including a scanning exposure system for exposing photosensitive materials in the camera, comprising:

image-forming means on a system optical axis for forming a real image of at least a portion of a photographic object at a predetermined image area, said image-forming means having a geometrical axis and an effective focal distance for any given object point which is a direct function of the slope angle with respect to said geometrical axis of the chief ray from that object point;

first means on said system optical axis for effecting an angular optical scan of the object in coordination with an angular optical scan relative to said geometrical axis of said image-forming means by chief rays from successively scanned object points to cause object points near an angular extreme of the field of said system to be imaged at greater focal distances than object points less angularly divergent from said optical axis; and second means for effecting relative movement between said image area and said photosensitive materials at a predetermined velocity coordinated with the scan of said first means such that adjacent object points scanned successively are imaged in succession upon said photosensitive materials during said relative movement, whereby an image of the object may be recorded upon the photosensitive materials.

2. A photographic camera including a scanning exposure system for exposing photosensitive materials in the camera, comprising:

image-forming means on a system optical axis for forming a real image of at least a portion of a photographic object at a predetermined image area, said image-forming means having a geometrical axis and an effective focal distance for any object points which are a direct function of the slope angles with respect to said geometrical axis of the chief object rays from said object points;

first means for causing said image-forming means to scan said photographic object while varying the slope angles of said chief object rays to cause object points near an angular extreme of the field of said system to be imaged at greater focal distances than object points less angularly divergent from said optical axis; and second means for effecting relative movement between said image area and said photosensitive materials at a predetermined velocity coordinated with the scan of said first means such that adjacent object points scanned successively are imaged in succession upon said photosensitive materials during said relative movement, whereby an image of the object may be recorded upon the photosensitive materials.

3. A photographic camera including a scanning exposure system for exposing photosensitive material in the camera comprising:

image-forming means on a system optical axis for forming a real image of at least a portion of a photographic object at a predetermined image area, said image-forming means having a geometrical axis and an effective focal distance for any given object point which is a direct function of the slope angle with respect to said geometrical axis of the chief ray from that object point;

first means on said system optical axis for effecting an angular optical scan of the object in coordination with an angular optical scan relative to said geometrical axis of said image-forming means by chief rays from successively scanned object points to cause object points near an angular extreme of the field of said system to be imaged at greater focal distances than object points less angularly divergent from said optical axis;

second means for effecting relative movement between said image area and said photosensitive materials at a predetermined velocity coordinated with the scan of said first means such that adjacent object points scanned successively are imaged in succession upon said photosensitive materials during said relative movement, whereby an image of the object may be recorded upon the photosensitive materials; and compensation means coordinated with said scanning means and said movement-effecting means for causing the optical path length of exposure light in image space, and thus the magnification, to vary during a scan of the object in a direct relationship to the magnitude of the scan axis component of the slope angle in object space of the chief ray from an object point being scanned, thereby to cause the images formed by said image-forming means to be substantially in focus and substantially free from cylindrical perspective distortion.

4. A photographic camera including a scanning exposure system for exposing photosensitive material in the camera comprising:

image-forming means on a system optical axis for forming a real image of at least a portion of a photographic object at a predetermined image area, said image-forming means having a geometrical axis and an effective focal distance for any object points which are a direct function of the slope angles with respect to said geometrical axis of the chief object rays from said object points;

first means for causing said image-forming means to scan said photographic object while varying the slope angles of said chief object rays to cause object points near an angular extreme of the field of said system to be imaged at greater focal distances than object points less angularly divergent from said optical axis;

second means for effecting relative movement between said image area and said photosensitive materials at a predetermined velocity coordinated with the scan of said first means such that adjacent object points scanned successively are imaged in succession upon said photosensitive materials during said relative movement, whereby an image of the object may be recorded upon the photosensitive materials; and compensation means coordinated with said scanning means and said movement-effecting means for causing the optical path length of exposure light in image space, and thus the magnification, to vary during a scan of the object in a direct relationship to the magnitude of the scan axis component of the slope angle in object space of the chief ray from an object point being scanned, thereby to cause the images formed by said image-forming means to be substantially in focus and substantially free from cylindrical perspective distortion.

5. A compact photographic camera for exposing photosensitive material comprising, in combination:

image-forming means on an optical axis for forming a real image of at least a portion of a photographic object at a predetermined image area;

light reflective means for folding said optical axis from said object to said image area;

scanning means disposed on said optical axis for cooperation with said image-forming means to effect a continuous angular optical scan of the object such that successively scanned object points are imaged in succession at said image;

means for effecting relative movement between said image area and said photosensitive material at a predetermined velocity coordinated with the scan of said scanning means such that adjacent object points scanned successively are imaged in succession upon said photosensitive material during said relative movement, whereby an image of the object may be recorded upon the photosensitive material; and compensation means coordinated with said scanning means and said movement-effecting means for causing the optical path length of exposure light between the last surface of said image forming means and said image area in a direct relationship to the magnitude of the scan axis component of the slope angle in object space of the chief ray from an object point being scanned to substantially reduce cylindrical perspective distortion in the images formed by said image-forming means.

6. A photographic camera including a scanning exposure system for exposing photosensitive material in the camera, comprising:

image-forming means on an optical axis for forming a real image of at least a portion of a photographic object at a predetermined image area;

means defining an elongated focal plane aperture at said image area;

scanning means disposed on said optical axis for cooperation with said image-forming means to effect a continuous angular optical scan of the object during an exposure interval such that successively scanned object points are imaged in succession by said image-forming means at said image area;

transport means for transporting photosensitive materials behind said aperture and through said image area at a predetermined velocity coordinated with the scan rate of said scanning means such that adjacent object points scanned successively are imaged in succession upon said photosensitive materials during transportation thereof behind said aperture to maintain said image of the object stationary relative to said photosensitive materials; and compensation means coordinated with said scanning means for varying the optical path length of exposure light between the last surface of said image-forming means to said image area, from a maximum at one extreme of said image area, to a minimum at the center and back to a maximum at the other extreme of said image area as measured along said optical axis, to alter the magnification of elemental images formed successively by said image-forming means to cause all parts of the total image formed to be substantially free from cylindrical perspective distortion.

7. A photographic camera including a scanning exposure system for exposing photosensitive materials in the camera, comprising:

image-forming means on an optical axis for forming a real image of at least a portion of a photographic object at a predetermined image area, said image-forming means having a geometrical axis and an effective focal distance for any given object point which is a direct function of the slope angle with respect to said geometrical axis of the chief ray from that object point;

means defining an elongated focal plane aperture at said image area;

scanning means including said image-forming means for effecting an angular optical scan of the object in coordination with an angular optical scan of said image-forming means by chief rays from successively scanned object points to cause object points near an angular extreme of the field of said image-forming means to be imaged at greater focal distances than object points less angularly divergent from said optical axis;

transport means for transporting photosensitive materials behind said aperture and through said image area at a predetermined velocity coordinated with the scan rate of said scanning means such that adjacent object points scanned successively are imaged successively upon said photosensitive materials during transportation thereof behind said aperture to maintain said image of the object stationary relative to said photosensitive materials; and compensation means coordinated with said scanning means and said transport means for causing the optical path length of exposure light in image space and thus the magnification, to vary during a scan of the object in a direct relationship to the magnitude of the scan axis component of the slope angle in object space of the chief ray from an object point being scanned to cause the images formed by said image-forming means to be substantially in focus and substantially free from cylindrical perspective distortion.

8. The apparatus defined by claim 7 wherein said scanning means includes a light reflective scanning surface mounted for angular movement behind said image-forming means for effecting a scan of the object through said image-forming means.

9. The apparatus defined by claim 8 wherein said means for varying said optical path length includes means for effecting a gross displacement of said image-forming means with respect to said image area during a scan of the object.

10. The apparatus defined by claim 8, wherein said means for varying said optical path length comprises light reflective means in the light path between said image-forming means and said image area and motive means for translating said light reflective means during a scan of the object along a locus of travel effective to cause said variations in optical path length.

11. The apparatus defined by claim 10 wherein said light reflective means and said scanning means include a single light reflective surface.

12. The apparatus defined by claim 10 wherein said light reflective means includes a light reflective surface exclusive of said scanning surface.

13. The apparatus defined by claim 7 wherein said scanning means includes a light reflective scanning surface positioned forward of said image-forming means and mounted for angular movement about a rotational axis to effect a scan of the object, and further means for effecting angular movement of said image-forming means during a scan of the object about an axis parallel to the said axis of angular movement of said scanning surface to accomplish said angular optical scan of said image-forming means.

14. The apparatus defined in claim 13 wherein said means for varying said optical path length includes means for effecting a gross displacement of said image-forming means with respect to said image area through a predetermined locus of travel during a scan of the object.

References Cited

UNITED STATES PATENTS

| | | | |
|---|---|---|---|
| 1,136,761 | 4/1915 | Becker | 95—15 |
| 1,950,166 | 3/1934 | Durholz | 95—45 |
| 2,682,194 | 6/1954 | Rosenburgh | 88—24 |
| 3,030,861 | 4/1962 | Mortimer et al. | 350—187 |
| 3,057,259 | 10/1962 | Schuma | 350—187 |

JOHN M. HORAN, Primary Examiner

DAVID B. WEBSTER, Assistant Examiner

U.S. Cl. X.R.

95—45; 355—52